L. A. GRIFFIN & L. C. VANDERLIP.
SUCTION APPARATUS FOR CONVEYER CONDUITS.
APPLICATION FILED JAN. 7, 1915. RENEWED FEB. 16, 1917.
1,271,567.
Patented July 9, 1918.
2 SHEETS—SHEET 1.
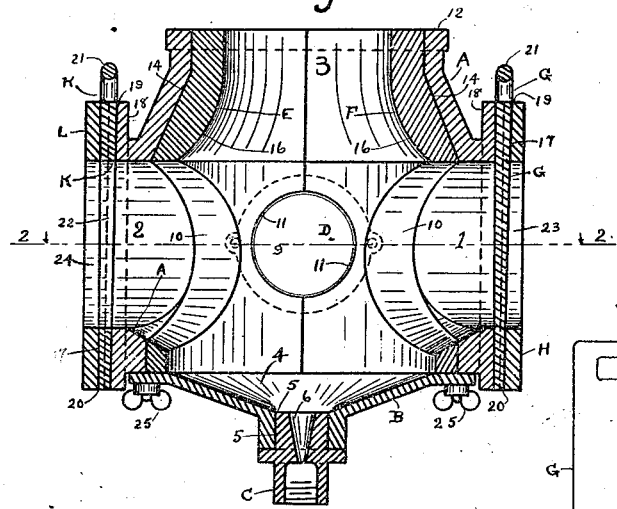
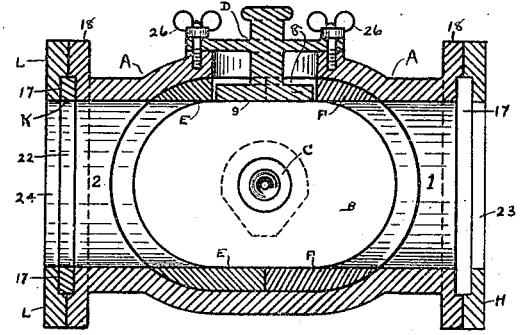
Witnesses.
Fro. N. Fleming
Earnest A. Skinner
Inventors.
Lorne A. Griffin
By Louis C. Vanderlip
his atty.
Louis C. Vanderlip L. A. GRIFFIN & L. C. VANDERLIP.
SUCTION APPARATUS FOR CONVEYER CONDUITS.
APPLICATION FILED JAN. 7, 1915. RENEWED FEB. 16, 1917.

1,271,567.

Patented July 9, 1918.
2 SHEETS—SHEET 2.

Witnesses.
Geo. N. Fleming
Earnest A. Skinner

Inventors.
Lorne A. Griffin
By Louis C. Vanderlip
their atty.
Louis C. Vanderlip.

UNITED STATES PATENT OFFICE.

LORNE A. GRIFFIN AND LOUIS C. VANDERLIP, OF ELKHART, INDIANA, ASSIGNORS, BY DIRECT AND MESNE ASSIGNMENTS, TO AMERICAN STEAM CONVEYOR CORPORATION, OF CHICAGO, ILLINOIS, A CORPORATION OF NEW YORK.

SUCTION APPARATUS FOR CONVEYER-CONDUITS.

1,271,567.  Specification of Letters Patent.  Patented July 9, 1918.

Application filed January 7, 1915, Serial No. 924. Renewed February 16, 1917. Serial No. 149,148.

*To all whom it may concern:*

Be it known that we, LORNE A. GRIFFIN and LOUIS C. VANDERLIP, citizens of the United States, residing at Elkhart, in the county of Elkhart and State of Indiana, have invented new and useful Improvements in Suction Apparatus for Conveyer-Conduits, of which the following is a specification.

Our invention relates to suction apparatus for the conveyance of loose, abrasive and relatively disintegrated material in conveyer conduits wherein a jet of steam, or fluid under pressure, is discharged into a three-way fitting connected at two lateral openings with suction conduits and at a third opening with the discharge conduit.

The objects of our invention, are, first, the production of a suction machine of the class described provided with a plurality of suction inlet openings both of which may be alternately controlled by gate valves in order that one may be closed while the other remains open when the suction machine is in operation, second, the use of wear liners to protect the interior of the three-way fitting from the abrasive action of the conveyer contents, and, third, the production of a fitting of the kind described in which the wear lining may be replaced without the removal of the fitting itself from the conduit line.

Figure 3:
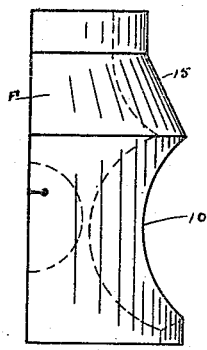
Figure 4:
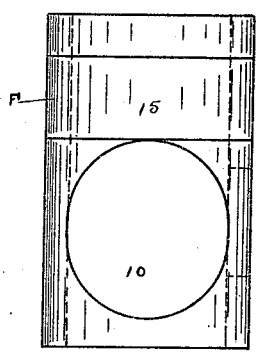
Figure 5:
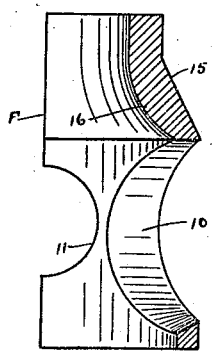
Figure 6:
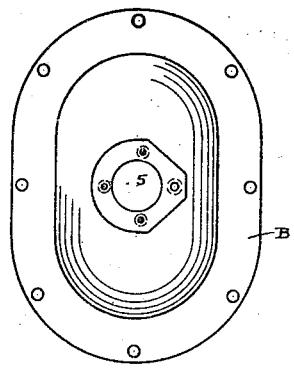

In the annexed drawings, Figure 1 is a longitudinal section showing the lining and the gates in position, with one gate open and one closed; Fig. 2 is a section on the line 2—2 of Fig. 1 with one gate removed; Fig. 3 is an end elevation of a half wear liner; Fig. 4 is a side elevation of a half wear liner; Fig. 5 is a section in elevation of a half wear liner; and Fig. 6 is a plan view of the bottom plate; and Fig. 7 is a side view in elevation of the gate valve G.

The component parts of our invention are clearly shown on the annexed drawings, wherein A is the three-way fitting body, B the bottom plate, C is a nozzle for fluid under pressure, D is a handhole cover, E and F are half wear liners, G is a gate valve, H is a gate valve half body, K is an open gate, and L is a half body for the gate valve.

It frequently occurs that it is necessary to have two conduit suction lines converge at a common point to expel their contents through a single discharge conduit line, and in such a case the suction apparatus, or machine, is placed at the point of convergence for the purpose of drawing the conduit contents from either line thereto and for discharge into the single discharge line. Under such conditions, it becomes necessary, in order to gain the highest efficiency, to close the conduit line not in use to produce an effective suction, or vacuum, in the conduit line open to the suction apparatus. Our invention is made in contemplation of such a condition, and by its use two converging suction conduit lines may be alternately used with efficiency.

On the drawings, A is the body of the three-way fitting, or suction machine body, which is provided with the lateral suction inlet openings 1 and 2, and the discharge opening 3. The body portion opposite the discharge opening 3 is provided with a wear lining insertion opening 4 of oval shape adapted to be covered and sealed by the cover plate B of oval formation. The cover plate B is penetrated at or adjacent its center by an opening 5 adapted to receive the fluid nozzle C which may be secured therein in any suitable manner. The issuing end 6 of the nozzle C is substantially coaxial with the discharge opening 3. The annular handhole 8 is formed in one side of the suction machine body A and is adapted to be closed and sealed by the hand hole plate D, the inner face 9 of which is flat and flush with the adjacent interior surface of the wear liners E and F.

The wear liners E and F are provided to form one complete removable lining for the suction machine, and are right and left hand in formation. Each liner is provided with annular opening 10 adapted to register with the suction inlet opening 1 or 2. Each half liner is also provided with a semi-annular lateral opening 11 to form an annular handhole cover opening within which the portion 9 of the handhole cover D is arranged. The liners E and F extend from the inner surface of the bottom plate B to and flush with the face of the discharge opening flange 12 with their edges converging at 13. The discharge opening 14 of the body A is enlarged to accommodate the liners E and F, the bore of which at the discharge opening 3 must be substantially equal to the bore of the discharge conduit line and annular in formation. The upper exterior surface 15 of the liners E and F is outwardly flaring in formation to accommodate the enlargement of the bore of the bend at 16 at the wear surface thereof. And the interior surface 14 of the body A is constructed to conform to the configuration of the surface 15.

At suction inlet openings 1 and 2 are provided the gate valve slots 17 formed by the combination of the flanges 18 and 18, integral with body A, and the detachable flanges H and L bolted to flanges 18, and open at 23 and 24, respectively. The slots 17 thus formed taper from the top thereof, 19 and 19, the widest part, to the bottom portion 20 and 20, the narrowest portion thereof, and their inner surfaces are preferably machined to a smooth finish and uniform taper, or wedge formation.

For slidable operation in gate slots 17 the gate valves G and K are provided, each being adapted for slidable operation in both slots 17, and each of wedge formation to fit the slots 17 closely. A handle 21 is provided to manipulate each valve G and K. When the suction machine is in use and inlet opening 2 is open, the solid gate valve G is arranged in the slot 17 at opening 1, and the gate K provided with the inlet aperture 22, is arranged in the slot 17 of the inlet opening 2 to permit the passage of the material through aperture 22 therein. When material is to be drawn through opening 1, the gates G and K are interchanged, thereby clearing the inlet 1 and closing opening 2.

The gate flanges H and L are adapted to receive the flanges of suction pipe lines to which they may be bolted, or secured in any other appropriate manner. Bottom plate B is secured to member A by the bolts and nuts 25, and the handhole cover D to the same member by bolts and nuts 26.

We claim:—

1. A device of the class described comprising a body member provided with a plurality of inlet openings and a discharge opening; a wear lining arranged within the body member and provided with openings in registration with said inlet and discharge openings; a wear lining insertion opening in the body member; and a cover plate detachably secured over said insertion opening.

2. A device of the class described comprising a body member provided with a plurality of inlet openings and a discharge opening; a removable wear lining comprising a plurality of sections arranged within the body member and provided with openings in registration with said inlet and discharge openings; a wear lining insertion opening in said body member; and an apertured cover plate detachably secured over said insertion opening.

3. A device of the class described comprising a body member provided with a plurality of inlet openings and a discharge opening, and provided also with a hand hole; a wear lining arranged within the body member and provided with openings in registration with said inlet and discharge openings and said hand hole; a wear lining insertion openings in the body member; a cover plate detachably secured over said insertion opening; and a hand hole cover detachably secured over said hand hole.

4. A device of the class described comprising a body member provided with a plurality of inlet openings and a discharge opening; a wear lining arranged within the body member and provided with openings in registration with said inlet and discharge openings; a wear lining insertion opening in the body member; a cover plate detachably secured over said insertion opening; and means for sealing one inlet opening while the other remains open.

5. A device of the class described comprising a body member provided with a plurality of inlet openings and a discharge opening; a wear lining arranged within the body member and provided with openings in registration with said inlet and discharge openings; a wear lining insertion opening in the body member; a cover plate detachably secured over said insertion opening; and interchangeable means for controlling said inlet openings whereby either opening may be closed while the other remains open.

6. A device of the class described comprising a body member provided with a plurality of inlet openings and a discharge opening; a removable wear lining comprising two sections arranged within the body member and provided with openings in registration with said inlet and discharge openings; a wear lining insertion opening formed in said body member opposite said discharge opening; and a centrally apertured cover plate detachably secured over said insertion opening.

7. In a structure of the class described, the combination with a body member having a plurality of radial openings and a pair of oppositely disposed axial openings, of a wear lining having openings registering with the openings in said body member, and insertible and removable through one of said axial openings, and a cover plate for said last named opening, provided with an opening.

8. In a structure of the class described, the combination with a body member having a plurality of radial openings and a pair of oppositely disposed axial openings, of a wear lining having openings registering with the openings in said body member, and insertible and removable through one of said axial openings, and a cover plate for said last named opening.

9. In a structure of the class described, the combination with a body member having a discharge opening and a pair of inlet openings, of a pair of interchangeable valve members adapted to co-act with said inlet openings, one of said valve members being provided with an opening to register with one of said inlet openings and the other of said valve members being constructed to close the other of said inlet openings.

10. A device of the class described comprising a body member having a plurality of inlet openings and a discharge opening, a removable wear lining comprising two sections arranged within the body member and having openings in registration with said inlet and discharge openings, a wear lining insertion opening in said body member opposite said discharge opening, and a cover plate detachably secured over said insertion opening.

In witness whereof we have hereunto affixed our signatures in the presence of two witnesses.

LORNE A. GRIFFIN.
LOUIS C. VANDERLIP.

Witnesses:
EARNEST A. SKINNER,
F. EVERETT BERTON.

Copies of this patent may be obtained for five cents each, by addressing the "Commissioner of Patents, Washington, D. C."